United States Patent [19]
Kuwabara

[11] Patent Number: 5,101,390
[45] Date of Patent: Mar. 31, 1992

[54] TRACK-JUMP DEVICE FOR A DISC DRIVE APPARATUS

[75] Inventor: Shinichiro Kuwabara, Tokyo, Japan

[73] Assignee: Sony Corporation, Tokyo, Japan

[21] Appl. No.: 332,935

[22] PCT Filed: Jul. 27, 1988

[86] PCT No.: PCT/JP88/00752

§ 371 Date: Mar. 27, 1989

§ 102(e) Date: Mar. 27, 1989

[87] PCT Pub. No.: WO89/01223

PCT Pub. Date: Feb. 9, 1989

[30] Foreign Application Priority Data

Aug. 1, 1987 [JP] Japan ................. 62-193062

[51] Int. Cl.$^5$ ................. G11B 7/095; G11B 20/00
[52] U.S. Cl. ................. 369/44.28; 360/77.02
[58] Field of Search ............ 369/44.28, 44.29, 44.32, 369/47, 50, 48, 44.25; 358/342, 907; 360/77.02, 77.06, 77.05, 78.04, 78.06, 78.05

[56] References Cited

U.S. PATENT DOCUMENTS

| | | | |
|---|---|---|---|
| 4,506,149 | 3/1985 | Utsumi | 369/44.41 |
| 4,660,191 | 4/1987 | Maeda et al. | 369/44.41 |
| 4,724,494 | 4/1988 | Koide | 360/77.06 |
| 4,896,309 | 1/1990 | Yamakawa et al. | 369/44.41 |

FOREIGN PATENT DOCUMENTS

| | | |
|---|---|---|
| 55-132537 | 10/1980 | Japan. |
| 58-205961 | 2/1983 | Japan. |
| 60-32134 | 2/1985 | Japan. |
| 60-63776 | 12/1985 | Japan. |
| 61-977 | 6/1986 | Japan. |

Primary Examiner—Roy N. Envall, Jr.
Assistant Examiner—Hindi Nabil

[57] ABSTRACT

A track-jump device for a disc drive apparatus for jump from one track to a neighboring track on a disc-like recording medium. A tracking error signal $S_{TE}$, an on-track signal $S_{OT}$ whose phase is deviated by 90° relative to the tracking error signal according to displacement in the direction of track width and which exhibits a peak value when it is on the track, a signal $\overline{S_{TE}}$ having a phase opposite to the tracking error signal, and signal $\overline{S_{OT}}$ having a phase opposite to the on-track signal are successively switched by a switch (20) and are sent to a tracking drive circuit (27) to effect the track-jump. The servo operation is continued even during the track-jump, and the servo loop is not interrupted. Therefore, track-jump is effected while maintaining advantage in regard to safety, reproducibility, and compatability of pickups.

5 Claims, 3 Drawing Sheets

TRACK-JUMP DEVICE FOR A DISC DRIVE APPARATUS

TECHNICAL FIELD

This invention relates to a track-jump device for a disc drive apparatus, such as an optical disc reproducing apparatus, for effecting a jump from one track to a neighboring track on the disc.

BACKGROUND OF ART

In a disc drive apparatus for recording and/or reproducing on or from a disc-shaped recording medium such as an optical disc or a magneto-optical disc, using the optical or magneto-optical recording and/or reproducing method, for example, it becomes necessary to perform a so-called track-jump in which the recording and/or reproducing head is to be moved rapidly along the radial direction, as when seaching a desired data, number or image, or when performing a specialized playback or reproducing operation, such as slow reproduction. This track-jump is classified into a medium to long distance jump over several or more tracks and a track-by-track-jump. Even in the medium to long distance jump, a track-by-track-jump ultimately becomes necessary to perform for positioning the head on the target track.

For effecting the track-jump, the conventional practice is to cancel the so-called tracking servo and to supply track-jump drive pulses, composed of acceleration and deceleration pulses, to for example, a head shifting device. Inasmuch as the servo is deenergized temporarily during such track-jump, safety problems are presented, while a deficiency may arise that it takes long time until the tracking servo starts its operation effectively directly after the head arrives at the target track.

In view of the above described problems of the prior art device, it is an object of the present invention to provide a track-jump device for a disc drive apparatus wherein a stable operation may be provided without deenergizing the tracking servo at least at the time of track-by-track-jump.

DISCLOSURE OF THE INVENTION

For achieving the above object, the present invention provides a track-jump device for a disc drive apparatus for effecting track-jump from a track to an adjacent track on a disc-shaped recording medium, comprising a circuit for generating a tracking error signal, an on-track signal dephased by 90° from said tracking error signal and reaching a peak value when it is disposed on a track, a reverse-phase signal of said tracking error signal and a reverse-phase signal of said on-track signal, and switching means for switching the aforementioned four signals before outputting of said four signals, characterized in that said four signals are sequentially switched by said switching means and the thus switched signals are transmitted to a tracking control circuit to effect track-jump from one track to an adjacent track.

According to the present invention, having the above feature, the four signals dephased sequentially by 90° along the widthwise direction of the track, or the radial direction of the disc, are switched sequentially at the time of track jump to effect a track-by-track-jump without deenergizing the tracking servo.

BEST EMBODIMENT OF PRACTICING THE INVENTION

Figure 1:
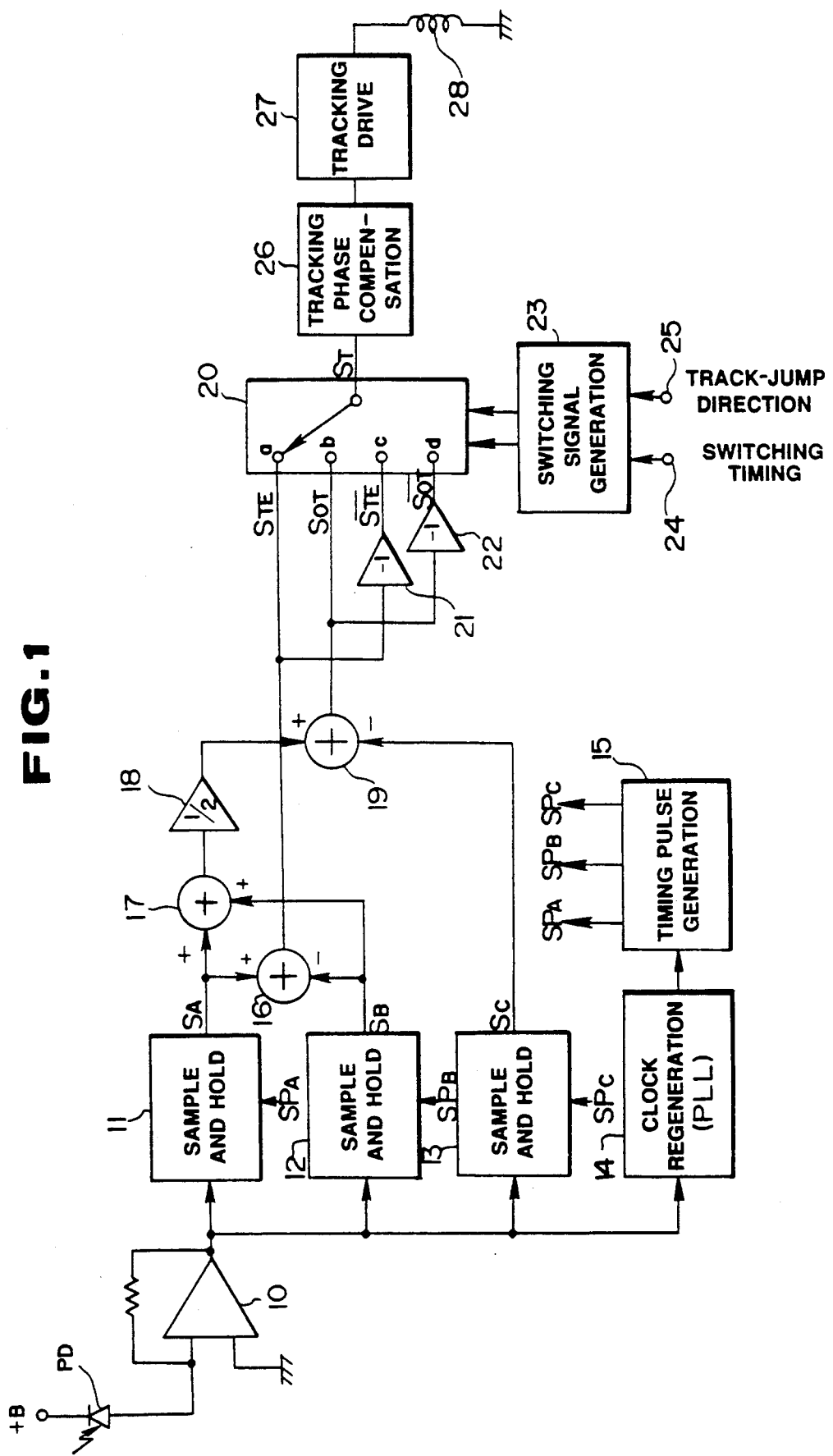
FIG. 1 is a block circuit diagram showing an embodiment of the present invention.
Figure 2:
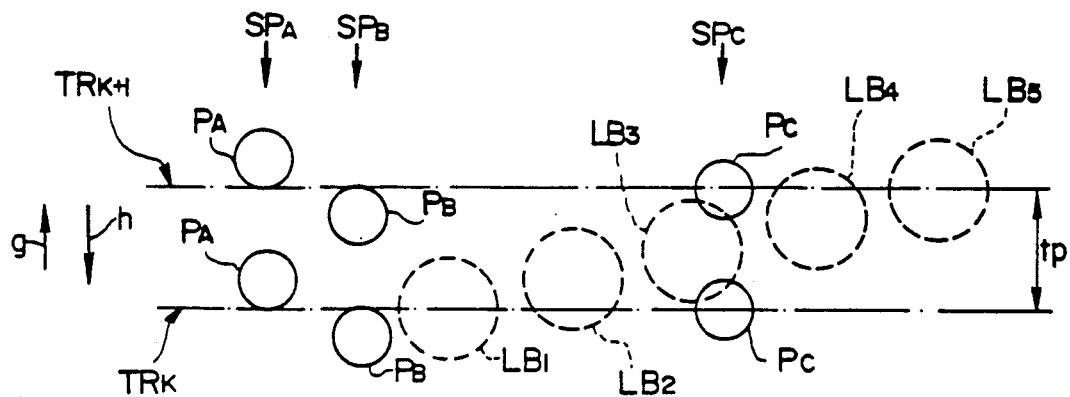
FIG. 2 is a diagrammatic view for illustrating the track-jump operation.

An embodiment of a track-jump device for the disc drive apparatus according to the present invention will be explained hereinbelow by referring to the drawings. The disc drive apparatus in the present embodiment is assumed to be that disclosed in the specifications of the present Applicant's Japanese Patent Application Nos. 180925/1986, 190274/1986 and 232512/1986. FIG. 1 shows diagrammatically the tracking servo system of the present disc drive apparatus. The recording medium employed in the present disc drive apparatus is a magneto-optical disc or an optical disc having a recording format in which servo signal regions in each of which servo signals are recorded and data signal regions in each of which at least data signals are recorded are formed alternately along the circumferential direction of the disc. In each of the servo signal regions, pits $P_A$, $P_B$ and $P_C$ such as shown in FIG. 2 are formed. The pits $P_A$ and $P_B$ are used mainly for tracking servo and are formed with a shift in the vertical direction on both sides of the centerline of the track formed on the disc, as indicated by a chain dotted line in FIG. 2. The pit $P_C$ is used mainly as the reference clock for the PLL system and is formed on the aforementioned centerline of the track. The signals obtained upon reproducing these pits $P_A$, $P_B$ and $P_C$ are adapted to be sampled respectively by sampling pulses $SP_A$, $SP_B$ and $SP_C$ which will be described lates. FIG. 2 shows the pits of the servo regions on two neighboring tracks $TR_k$ and $TR_{k+1}$.

Referring to FIG. 1, the reproduced RF signals from one photo diode PD, which is a light receiving element of an optical pickup device for optically detecting the servo or data pits on the disc, are supplied via an equalizer amplifier 10 to three sample and hold circuits 11, 12 and 13 and to a clock regenerating circuit 14. The aforementioned sampling pluses $SP_A$, $SP_B$ and $SP_C$ are supplied to the sample and hold circuits 11, 12 and 13, respectively, for sampling the portions of the playback RF signals corresponding to the pits $P_A$, $P_B$ and $P_C$. The clock regenerating circuit 14 includes a PLL circuit, for example, and generates reference clocks synchronized with the pulses adapted for detecting the pits $P_C$. The clock signals from this clock regenerating circuit 14 are transmitted to a timing pulse generating circuit 15, from which the aforementioned sampling pulses $SP_A$, $SP_B$ and $SP_C$ are outputted.

The sample and hold output signals $S_A$, $S_B$ and $S_C$ for the pits $P_A$, $P_B$ and $P_C$ are output from the sample and hold circuits 11, 12 and 13, respectively. Of these sample and hold output signals, the signals $S_A$ and $S_B$, corresponding to the tracking servo pits $P_A$ and $P_B$, are transmitted to an adder (subtractor) 16 where one of the signals is subtracted from the other, such as $S_A - S_B$ to produce a tracking error signal $S_{TE}$. These signals $S_A$ and $S_B$ are summed together at the adder 17 and attenuated to $\frac{1}{2}$ by an amplifier or attenuator 18 to give a mean value $(S_A+S_B)/2$. Then, a difference of the mean value from the output signal $S_C$ from the sample and hold circuit 13, $(S_A+S_B)/2-S_C$, is found by an adder (subtractor) 19, to give a so-called on-track signal $S_{OT}$ which assumes a peak (a locally maximum value or a locally minimum value) when the head is on the track.

When the signal waveform is viewed along the radial direction of the disc or along the track width, these tracking error signals $S_{TE}$ and on-track signals $S_{OT}$ are dephased from each other by 90°, when one track pitch is taken as one period. These signals $\overline{S_{TE}}$, $\overline{S_{OT}}$ and signals $S_{TE}$, $S_{OT}$ obtained by inverting these signals at the inverters 21 and 22, are dephased by 90° sequentially from one another.

Figure 3:
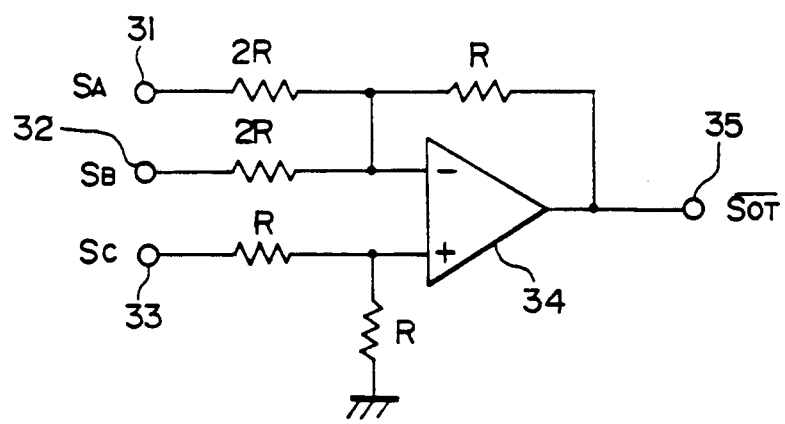
FIG. 3 is a circuit diagram showing an example of the output circuit of on-track signals $S_{OT}$.

It will be noted that the aforementioned on-track signals $S_{OT}$ (or $\overline{S_{OT}}$) may also be obtained by an arrangement such as shown in FIG. 3. In this figure, the sample and hold output signals $S_A$, $S_B$ and $S_C$ are supplied to input terminals 31, 32 and 33, respectively. The signals $S_A$ and $S_B$ from the terminals 31 and 32 are supplied to an inverting input terminal of an operational amplifier 34, each via an input resistor having a resistance equal to 2R, while the signal $S_C$ from the terminal 33 is supplied to a non-inverting input terminal of the operational amplifier 34. The resistance of a negative feedback resistor connected between an output terminal 35 and a non-inverting input terminal of the operational amplifier 34 is equal to R, and the inverting input terminal of the amplifier 34 is ground via a resistor having a resistance R, so that the output from the output terminal 35 is $-(S_A+S_B)/2+S_C$, this being no other than the signal $\overline{S_{OT}}$ inverted from the on-track signal $S_{OT}$.

Turning again to FIG. 1, the aforementioned four signals $S_{TE}$, $S_{OT}$, $\overline{S_{TE}}$ and $\overline{S_{OT}}$ are supplied to four select terminals a, b, c and d of a four-input changeover switch or multiplexor 20, respectively, so as to be switched in a predetermined sequence by a switching control signal from a switching signal generator 23 and thereby formed into a tracking control signal $S_T$. A switching timing pulse governing the timing of the above described switching operation and a track-jump direction control signal for deciding whether the track-jump is in the radially outward direction or in the radially inward direction, are supplied to terminals 24 and 25 of the switching signal generator 23. The tracking control signal $S_T$ from the changeover switch 20 is supplied to a tracking control circuit. In the embodiment shown herein, the tracking control circuit is comprised of a tracking phase compensating circuit 26, a tracking drive circuit 27 and a tracking coil 28 for drivingly controlling the recording and/or reproducing head along the track width (or the radius of the disc).

Figure 4:
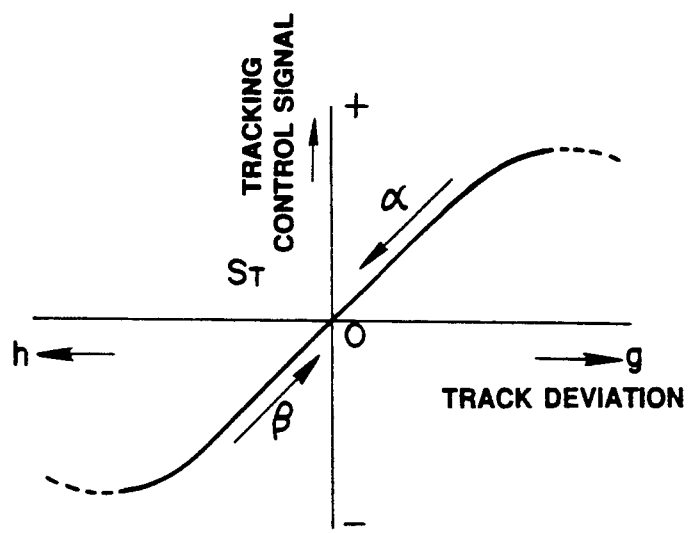
FIG. 4 is a chart showing tracking control characteristics.

The relation between the deviation or displacement of the magnetic head along the track width (or along the radial direction of the disc) and the tracking control signal $S_T$ (or the tracking error signal in general) will be explained by referring to FIG. 4. In this figure, the deviation or displacement of the magnetic head along the track width is plotted on the abscissa, and the tracking control signal $S_T$ is plotted on the ordinate. The arrow marks g and h along the abscissa correspond with the arrow marks g and h along the track radius in FIG. 2. The tracking control circuit, including the tracking drive circuit 27, tracking coil 28 etc., performs a so-called tracking control by moving the head to a position of the zero value of a tracking control signal $S_T$, or a so-called stable control point or target point, for example, track center position, as indicated by the arrow marks $\alpha$ and $\beta$ and the curve in FIG. 4, wherein the tracking control signal $S_T$ is obtained in dependence upon the direction and the sense of the head deviation. That is, when the tracking control signal $S_T$ is on the positive (+) side, control is performed towards the stable point O, as indicated by the arrow mark $\alpha$ on the characteristic curve, so that the head is moved along the arrow mark h and, when the signal $S_T$ is on the negative (−) side, the head is moved along the arrow mark g.

Figure 5:
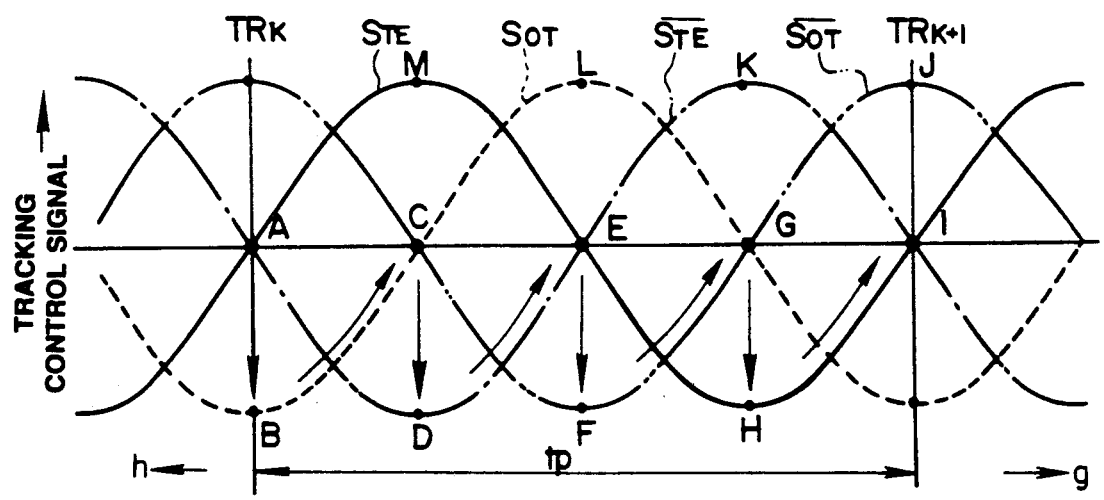
FIG. 5 is a diagrammatic view showing tracking control signals at the time of track-jump.

It will be noted that, in the embodiment of the present invention, the tracking control signal $S_T$, supplied to the tracking drive circuit 27 and to the tracking coil 28 via tracking phase compensating circuit 27, is obtained upon sequentially switching the signals $S_{TE}$, $S_{OT}$, $\overline{S_{TE}}$ and $\overline{S_{OT}}$. FIG. 5 shows these signals $S_{TE}$, $S_{OT}$, $\overline{S_{TE}}$ and $\overline{S_{OT}}$ in relation with the head position along the track width (the radial direction of the track). The abscissa in FIG. 5 indicates the widthwise direction of the track, and it will be seen that the signal $S_{TE}$, $S_{OT}$, $\overline{S_{TE}}$ and $\overline{S_{OT}}$ are dephased sequentially by 90° along the track width. When the signals are switched by the changeover switch 20 in this order (in the order of the select terminals a, b, c and d), the stable control point is switched sequentially in the order of A, C, E, G, I, ... in FIG. 5. As regards the positions of the points A, C, E, G, I, ... along the track width, the point A corresponds to the track $TR_k$, the points C, E and G correspond to the positions sequentially each spaced by one fourth the track pitch tp along the arrow mark g and the point I corresponds to the track $TR_{k+1}$.

Thus, when the changeover switch 20 is set to the terminal such that the tracking error signal $S_{TE}$ is output from the changeover switch 20 as the tracking control signal $S_T$, tracking control is performed so that the point A represents the stable point of tracking control. When the changeover switch 20 is set to the terminal b in this state, the aforementioned on-track signal $S_{OT}$ represents the tracking control signal $S_T$, so that the control shifts to the point B on the characteristic curve corresponding to $S_{OT}$ in FIG. 5. Since the stable or target control point at this time is the point C in FIG. 5, control is performed towards the point C, as shown by the arrow mark in the figure, and the control operation becomes stable at this point. By setting the switch 20 to the terminal c in the similar manner, the tracking control signal $S_T$ is switched to the signal $\overline{S_{TE}}$ and control is performed in a direction from the point O towards the point E in FIG. 5 until the control operation is stabilized at the stable point E. Thus, by cyclically switching the changeover switch 20 in the order of the terminals a, b, c and d, control shifts in the sequence of the points A, B, C, D, E, F, G, H and I, as shown by the arrow mark in FIG. 5, to control the head movement, so that the laser beam spot shifts its position in the sequence of $LB_2$, $LB_3$, ..., starting from $LB_1$ as shown in FIG. 2, for example, to perform track-jump from one track $TR_k$ to the adjacent track $TR_{k+1}$ (along the arrow mark g).

When a track-jump is to be performed over one track pitch tp, it suffices to perform the above described cyclic changeover operation of the changeover switch 20 for one cycle, that is, to make a switching in the sequence of a, b, c and d and again to a. When the track-jump is to be performed over a plurality of predetermined tracks, it suffices to perform the above cyclic switching operations for a number of cycles equal to the number of the tracks to be jumped over. As regards the switching timing for above mentioned operation, preset pulses are generated at about one-fourth period of the time required for track-jump, in consideration of the head shifting speed during track-jump, the pre-set pulses being transmitted to the terminal 24 shown in FIG. 1. Or alternatively, the zero-crossings of the signals $S_{TE}$, $S_{OT}$, $\overline{S_{TE}}$ and $\overline{S_{OT}}$ may be detected and the zero crossing detection signals are transmitted as the switching timing pulses to the terminal 24. By reversing the terminal switching sequence by the changeover switch 20 (to the sequence of the terminals a, d, c, b, a) the track jump may be performed in the direction shown by the arrow mark h, that is, in the direction from the track $TR_{k+1}$ towards the track $TR_k$. This is apparent when the signal changeover sequence shown in FIG. 5 is reversed. As an example of control shifting, control shifts in the sequence of the points J, G, K, E, L, C, M, A, starting at point I. A control signal indicating the track-jump direction is supplied to the terminal 25 shown in FIG. 1.

In the above described track-jump control operation, tracking servo remains energized during track-jump, since the tracking control signals are switched as described above, so that stable operation as well as superior reproducibility and interchangeability of the pickup head may be assured despite the simplified circuit construction.

That is, in the track-jump device for the disc drive apparatus according to the present invention, the tracking error signal and the signals sequentially dephased by 90° with respect to this tracking error signal along the track width, are switched sequentially before being supplied to the tracking control circuit, a servo operation may be sustained even during the track-jump to provide for stable track-jump and superior reproducibility and interchangeability of the pickup head.

It is to be noted that the invention is not limited to the above described embodiment, but may be adapted easily to track-jump in, for example, a so called CD (compact disc) or a video disc. The level detection signals for the playback RF signal in general, can be replaced as the aforementioned on-track signals. Various other modifications may naturally be made as long as these modifications are included within the purport of the present invention.

What is claimed is:

1. A track-jump device for a disc drive apparatus for effecting track-jump from one track to an adjacent track on a disc-shaped recording medium, comprising:

circuit means for generating a tracking error first signal, an on-track second signal dephased by 90° from said tracking error first signal and reaching a peak value when it is disposed on a track, a reverse-phase third signal of said tracking error first signal and a reverse-phase fourth signal of said on-track second signal, switching means for sequentially switching the four signals and outputting the respective signal after each switching has occurred, and tracking control circuit means connected to receive the four sequentially switched signals for effecting track-jump from one track to an adjacent track.

2. The track-jump device for a disc drive apparatus according to claim 1 wherein the four signals are switched sequentially at each one-fourth period of a time necessary for a jump from the one track to the adjacent rack and are transmitted to said tracking control circuit means.

3. The track-jump device for a disc drive apparatus according to claim 1 wherein said switching means includes means for detecting zero-crossings of said four signals and for sequentially switching said four signals at each zero-crossing detection before being transmitted to said tracking control circuit means.

4. The track-jump device for a disc drive apparatus according to claim 1 wherein the switching means sequentially switches said four signals in a forward or reverse order depending on a track-jump direction control signal input to said switching means.

5. A track-jump device for a disc drive apparatus for effecting track-jump from one track to an adjacent track on a disc-shaped recording medium, comprising:

circuit means for generating a tracking error first signal, an on-track second signal having a phase displacement of 90° from said tracking error first signal, a reverse-phase third signal of said tracking error first signal, and a reverse-phase first signal of said on-track second signal;

switching means for sequentially switching through the first through fourth signals and outputting a respective one of the signals after a sequential switching of each signal has occurred; and tracking control circuit means connected to receive the four sequentially switched signals for effecting a track-jump from one track to an adjacent track, one quarter of a distance being covered during the track-jump in correspondence with each of the four signals.

* * * * *